(12) United States Patent
Demule et al.

(10) Patent No.: US 12,498,403 B2
(45) Date of Patent: Dec. 16, 2025

(54) ELECTRICAL CABLE EQUIPPED WITH A DEVICE FOR INDICATING THE PRESENCE OF AN ELECTRICAL VOLTAGE

(71) Applicant: NEXANS, Courbevoie (FR)

(72) Inventors: Christophe Demule, Laizy (FR); Miguel Santana, Ste Foy les Lyon (FR); Samuel Griot, Lyons (FR)

(73) Assignee: NEXANS, Courbevoie (FR)

( * ) Notice: Subject to any disclaimer, the term of this patent is extended or adjusted under 35 U.S.C. 154(b) by 10 days.

(21) Appl. No.: 18/198,749

(22) Filed: May 17, 2023

(65) Prior Publication Data

US 2024/0118321 A1 Apr. 11, 2024

(30) Foreign Application Priority Data

May 18, 2022 (FR) ........................................ 2204707

(51) Int. Cl.
*G01R 19/00* (2006.01)
(52) U.S. Cl.
CPC ................................ *G01R 19/0084* (2013.01)
(58) Field of Classification Search
CPC .. G01R 19/0084; G01R 29/12; G01R 19/155; H01B 7/32; H01B 7/361
USPC ......................................................... 340/660
See application file for complete search history.

(56) References Cited

U.S. PATENT DOCUMENTS

| | | | |
|---|---|---|---|
| 2015/0214746 A1 | 7/2015 | Lopez Gomez et al. | |
| 2016/0377662 A1* | 12/2016 | Kasai | G01R 15/16 |
| | | | 324/149 |
| 2020/0303935 A1* | 9/2020 | Sorias | H02J 7/0048 |

FOREIGN PATENT DOCUMENTS

| | | |
|---|---|---|
| EP | 3 651 307 | 5/2020 |
| EP | 3651307 A1 * | 5/2020 |
| GB | 2 499 570 | 8/2013 |
| WO | 2022/029513 | 2/2022 |

OTHER PUBLICATIONS

International Search Report dated Jan. 2, 2023.

* cited by examiner

*Primary Examiner* — Eric Blount
(74) *Attorney, Agent, or Firm* — MUNCY, GEISSLER, OLDS & LOWE, P.C.

(57) ABSTRACT

An electrical cable (10) has at least one conductor (12), and further has a device for indicating the presence of an electrical voltage inside the cable (10). The device has at least one layer (14) at least partially covering the outer surface of the cable (10) in at least one region of the cable (10) and a means for transmitting a signal indicating the presence of an electrical voltage inside the cable (10).

6 Claims, 2 Drawing Sheets

ELECTRICAL CABLE EQUIPPED WITH A DEVICE FOR INDICATING THE PRESENCE OF AN ELECTRICAL VOLTAGE

RELATED APPLICATION

This application claims the benefit of priority from French Patent Application No. 22 04707, filed on May 18, 2022, the entirety of which is incorporated by reference.

FIELD OF THE INVENTION

The present invention relates to an electrical cable equipped with a device for indicating the presence of an electrical voltage inside this cable.

The invention belongs to the field of electrical cables. It has application in any type of network of electrical cables and in particular, but not only, in low-voltage electrical networks.

DESCRIPTION OF RELATED ART

It is currently impossible to know whether an electrical voltage is present inside an electrical cable without using a tool or dedicated test device such as a voltmeter.

OBJECTS AND SUMMARY

The present invention aims to overcome the above-mentioned disadvantages of the prior art.

For this purpose, the present invention proposes an electrical cable comprising at least one conductor, noteworthy in that it further comprises a device for indicating the presence of an electrical voltage inside the cable, the device comprising:
- at least one layer at least partially covering the outer surface of the cable in at least one region of the cable;
- a means for transmitting a signal indicating the presence of an electrical voltage inside the cable.

Thus, the present invention removes any risk of working by error on a live cable which would present a safety hazard, such as a cutting operation. In addition, the present invention does not require any tool or additional equipment outside of the cable itself. Furthermore, the invention makes it possible to know, in a very simple manner, whether an electrical voltage is present inside the cable, using a means for transmitting the signal indicating the presence of a voltage.

In a particular embodiment, the device for indicating the presence of an electrical voltage inside the cable further comprises at least one electronic component contained in the at least one layer and reacting to the presence of an electric field, and the transmitting means is connected to the at least one electronic component.

In a particular embodiment, the at least one layer comprises a plurality of layers of different shapes arranged in a plurality of regions of the outer surface of the cable.

The increase in the number of locations where the cable is monitored for the appearance of an electrical voltage improves the detection of the presence of this voltage.

In a particular embodiment, fewer than ten electronic components could be incorporated in the cable.

Hence, the presence of an electrical voltage in the cable is detected through the use of a very limited number of electronic components.

In a particular embodiment, the signal indicating the presence of an electrical voltage inside the cable is a light signal.

The installer or user working on the cable is thus immediately informed, at a glance, of the presence of an electrical voltage.

In a particular embodiment, the signal indicating the presence of an electrical voltage inside the cable is a sound signal.

The installer or user working on the cable is thus immediately informed of the presence of an electrical voltage, without even having to look at the cable.

In a particular embodiment, the means for transmitting the signal indicating the presence of an electrical voltage inside the cable comprises a means for triggering this transmission in the presence of a part of the human body of an operator at a predetermined distance from the cable.

This makes it possible to avoid triggering the transmission of the signal indicating the presence of an electrical voltage if no one is in the vicinity of the cable.

BRIEF DESCRIPTION OF THE DRAWINGS

Other aspects and advantages of the invention will emerge on reading the detailed description below of particular embodiments, provided by way of non-limiting examples, with reference to the attached drawings, in which.

DETAILED DESCRIPTION OF EMBODIMENT(S)

The electrical cable according to the present invention can be any type of cable, in particular but not necessarily a cable forming part of a low-voltage electrical network.

Figure 1:
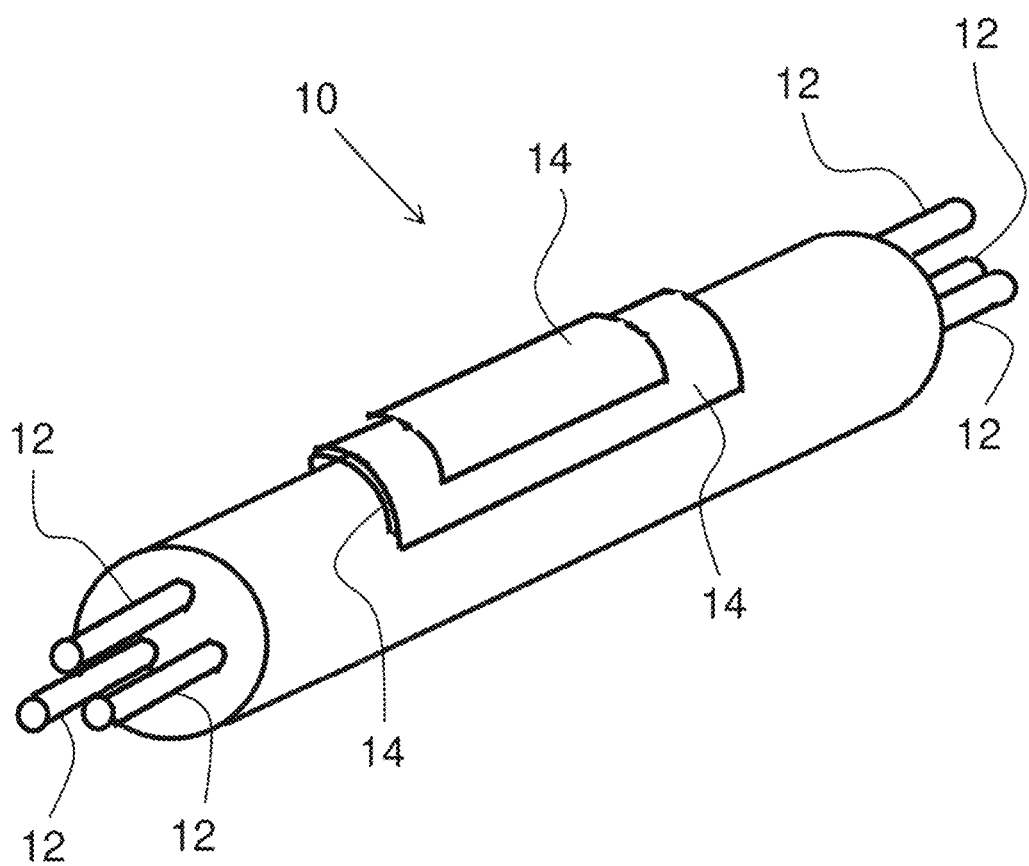
FIG. 1 is a schematic representation of an electrical cable according to the present invention, in a particular embodiment.

As shown in FIG. 1, the electrical cable 10 according to the present invention comprises at least one conductor 12. In the particular embodiment illustrated, the cable 10 comprises, by way of non-limiting example, three conductors 12.

In accordance with the present invention, the electrical cable 10 further comprises a device for indicating the presence of an electrical voltage inside the cable 10.

The device for indicating the presence of an electrical voltage inside the cable 10 comprises at least one layer 14 at least partially covering the outer surface of the cable 10 in at least one region of the cable 10. In the particular embodiment illustrated, the device comprises, by way of non-limiting example, three layers 14 which do not cover the same regions of the outer surface of the cable. However, in this non-limiting example, certain regions of the outer surface of the cable are covered simultaneously by the three layers 14. More generally, it is possible to have a plurality of layers 14 arranged in a plurality of regions of the outer surface of the cable 10, these regions possibly being disjoint or possibly overlapping.

Among the layers 14, one or more layers of the following type can be envisaged: conductive layer, reflective layer, protective, polarised layer, transparent or non-conductive outer layer for activating the device for indicating the presence of a voltage by touching it, layer reacting to a low electrical voltage by changing state (changing, for example, from an opaque layer to a transparent layer in the presence of a low electrical voltage), adhesive layer, layer for mounting an electronic circuit, semiconductor layer, dielectric layer. The layers other than the layer for mounting an electronic circuit are used for signalling the presence of an electrical voltage inside the cable.

The layers 14 can be of different shapes and sizes.

The at least one layer 14 can comprise two conductive layers, an intermediate layer located between these two layers and a layer for mounting an electronic circuit. Indeed, optionally but not compulsorily, the device for indicating the presence of an electrical voltage inside the cable 10 can further comprise at least one electronic component (not visible in FIG. 1) contained in said at least one layer 14, for example printed on this layer 14, and reacting to the presence of an electric field.

Indeed, the presence of an electrical voltage inside one or more conductors 12 will cause an electric field and it is the detection of this electric field by the at least one electronic component which will enable the presence of an electrical voltage inside the cable 10 to be signalled. The function of the at least one electronic component is to shape the captured signals in the event of the presence of an electrical voltage in the cable, so as to reproduce this detection in the form of a signal.

For this purpose, the device for indicating the presence of an electrical voltage inside the cable 10 also comprises a means for transmitting a signal indicating the presence of an electrical voltage inside the cable 10. This transmitting means (not shown in FIG. 1) can, for example, be connected to the at least one electronic component.

Advantageously fewer than ten electronic components can be incorporated in the cable 10.

The signal indicating the presence of an electrical voltage inside the cable 10, transmitted by the above-mentioned transmitting means, can be a light signal or a sound signal. The light signal can be, for example, emitted by a light-emitting diode arranged in or on one or more layers 14. The light signal can be in the form of a single predetermined colour, possibly taking the shape of a symbol, which appears only when a voltage is detected, or in the form of a permanently illuminated indicator light which changes colour in the event of detection of a voltage.

In a particular embodiment, it can be envisaged that the transmitting means does not operate continuously. For this purpose, it can comprise a means for triggering the transmission of the above-mentioned signal only in the presence of a part of the human body of an operator standing at a predetermined distance from said cable 10, typically when the operator moves his hand to within a few millimetres of the cable 10. This creates a local increase in the electric field causing a sufficient potential difference that the device for indicating the presence of an electrical voltage inside the cable is activated.

Figure 2:
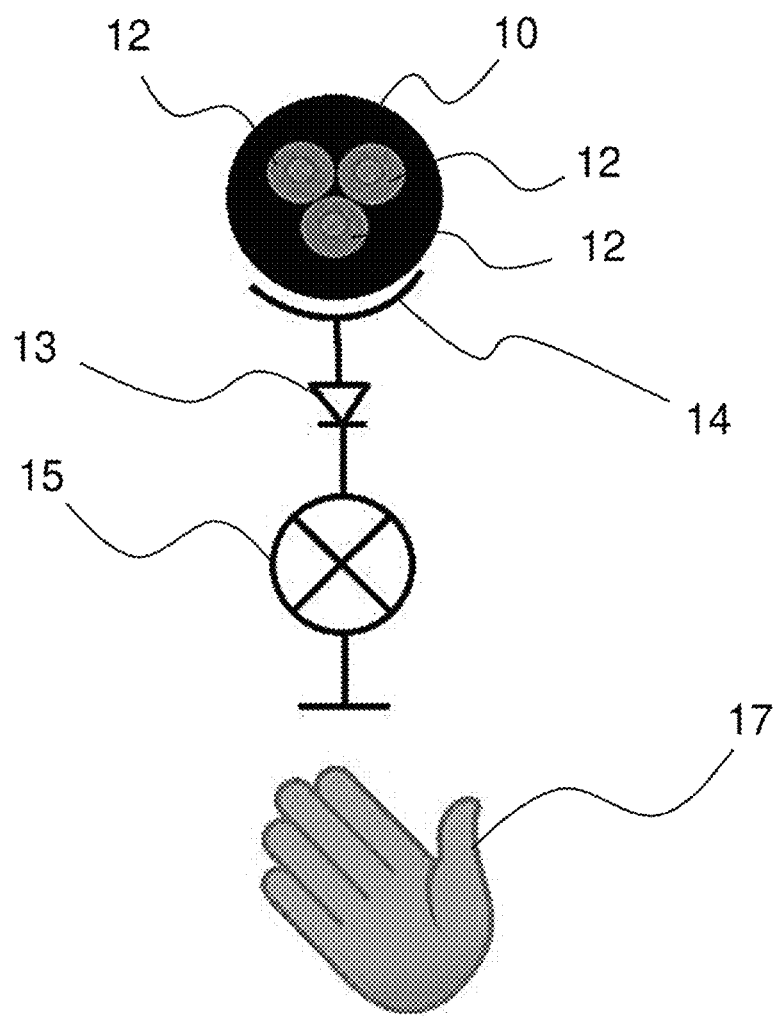
FIG. 2 is an equivalent circuit diagram showing the device for indicating the presence of an electrical voltage comprised in a cable according to the present invention, in a particular embodiment.

As shown by FIG. 2, by way of non-limiting example, the at least one layer 14 can comprise, as electronic components, a diode 13 and a lamp 15, printed on the layer 14 or incorporated on or in this layer 14 by any other technique. The hand 17 of a user placed close to the layer 14 triggers the activation of the device for indicating the presence of an electrical voltage.

In an alternative, without physical presence close to the cable, a metallic presence close to the cable, such as a cable tray, can also activate the device for indicating the presence of an electrical voltage inside the cable.

The invention claimed is:

1. An electrical cable comprising:
   at least one conductor; and
   a device for indicating the presence of an electrical voltage inside said cable, said device comprising:
   at least one layer at least partially covering the outer surface of said cable in at least one region of said cable;
   a transmitter that transmits a signal indicating the presence of an electrical voltage inside said cable; and
   at least one electronic component contained in said at least one layer and reacting to the presence of an electric field,
   wherein said transmitter is connected to said at least one electronic component.

2. The electrical cable according to claim 1, wherein said at least one layer comprises a plurality of layers of different shapes arranged in a plurality of regions of the outer surface of said cable.

3. The electrical cable according to claim 1, wherein the electrical cable comprises fewer than ten electronic components.

4. The electrical cable according to claim 1, wherein said signal indicating the presence of an electrical voltage inside said cable is a light signal.

5. The electrical cable according to claim 1, wherein said signal indicating the presence of an electrical voltage inside said cable is a sound signal.

6. The electrical cable according to claim 1, wherein said transmitter comprises a trigger that triggers said transmission when in the presence of a part of the human body of an operator at a predetermined distance from said cable.

* * * * *